United States Patent [19]

Nelson

[11] Patent Number: 4,600,351
[45] Date of Patent: Jul. 15, 1986

[54] FOWL METERING AND COOPING SYSTEM

[75] Inventor: Glenn S. Nelson, Fayetteville, Ark.

[73] Assignee: Board of Trustees University of Arkansas, Fayetteville, Ark.

[21] Appl. No.: 509,221

[22] Filed: Jun. 28, 1983

[51] Int. Cl.$^4$ ............................................. A01K 29/00
[52] U.S. Cl. ...................................... 414/331; 119/82;
198/505; 53/245; 53/249; 53/502; 53/535;
414/488; 414/498; 414/501
[58] Field of Search ............... 414/266, 267, 268, 270,
414/272, 331, 469, 486, 488, 498, 499, 501, 502,
503, 508, 111; 119/15, 82, 155; 53/245, 246,
249, 502, 535; 198/505, 311, 314

[56] References Cited

U.S. PATENT DOCUMENTS

| | | | |
|---|---|---|---|
| 733,824 | 7/1903 | Dueringer | 198/314 X |
| 2,896,384 | 7/1959 | Carlsen et al. | 53/502 |
| 3,722,477 | 3/1973 | Weldy et al. | 119/82 |
| 3,735,561 | 5/1973 | Wood | 53/535 X |
| 3,955,343 | 5/1976 | Tico | 414/502 X |
| 4,177,621 | 12/1979 | Powell, Jr. | 53/502 X |
| 4,201,156 | 5/1980 | Kahler | 119/82 |
| 4,301,769 | 11/1981 | Mola | 119/82 |
| 4,465,414 | 8/1984 | Theurer et al. | 414/499 X |

FOREIGN PATENT DOCUMENTS

| | | | |
|---|---|---|---|
| 2419238 | 10/1979 | France | 198/505 |
| 1101261 | 1/1968 | United Kingdom | 198/314 |

Primary Examiner—Joseph E. Valenza
Assistant Examiner—Ken Muncy
Attorney, Agent, or Firm—Mason, Fenwick & Lawrence

[57] ABSTRACT

A fowl harvesting apparatus receives fowl which are conveyed upwardly and deposited in a metering tray which actuates a switch to cut off the conveyor when a desired number of fowl have been deposited in the tray. The tray is then moved downwardly on a supporting framework to be positioned adjacent an open coop compartment of a multi-compartment coop unit following which the tray is pivoted to deposit the fowl in the associated coop compartment. The multi-compartment coop unit is shiftable into one of two positions in which one of two vertically aligned banks of coop compartments is positioned in alignment with the fowl receiving and depositing tray. Conveyor is provided for removing the multi-compartment coop unit following the filling of same so as to permit the positioning of an empty multi-compartment coop unit on the apparatus for subsequent filling purposes.

20 Claims, 11 Drawing Figures

FOWL METERING AND COOPING SYSTEM

BACKGROUND OF THE INVENTION

The present invention is in the field of fowl harvesting and handling equipment and is specifically directed to an apparatus for receiving fowl and discharging desired quantities of same into individual coop units. The term "fowl" as used hereinafter is used in its broadest generic sense and, while the preferred embodiment of the invention is illustrated in conjunction with broiler chickens, it should be understood that the invention is usable with other fowl including, but not limited to, turkeys, guinea hens, ducks, geese, and the like.

It is the present conventional practice in commercial broiler production systems to employ hand labor for harvesting live broilers. A crew of approximately eight worker can normally catch and coop between 5,000 and 7,000 broilers per hour. Each bird is individually caught by hand and placed in coops for transport to the processing plant. The most widely employed predominant type of coop utilized in the industry is constructed from wood, plastic, and or metal and is capable of containing from ten to fifteen birds per coop. Recently, large multi-compartment coop units consisting of multi-tiered coops consisting of vertical banks of stacked coop compartments have been employed for receiving approximately forty broilers per coop compartment. Such coop units are mechanically handled at the processing plant to provide substantial labor savings and increased efficiency with the consequent saving being approximately twenty to thirty per cent in labor costs. Unfortunately, the use of such coop units does not provide equivalent cost savings in the harvesting and cooping of the broilers using the conventional manual procedures. Another shortcoming of the conventional procedures is that the fowl are frequently bruised or damaged during the catching and cooping operation.

Therefore, it is the primary object of the present invention to provide a new and improved fowl cooping apparatus and method.

SUMMARY OF THE INVENTION

Achievement of the foregoing object is enabled by the preferred embodiment through the provision of a power driven vehicle including a supporting framework on which an inclined conveyor system is mounted. The conveyor system is adjustable and has a lower infeed end positionable near ground level with an infeed hopper being provided on the lower end of the conveyor for receiving either manually collected or mechanically conveyed broilers which are fed upwardly by the conveyor system. The broilers are deposited by the upper discharge end of the conveyor system into a fowl receiving and holding means which includes a receiving tray having a bottom wall and side wall and which is mounted on a pivotal support frame which is held in an upper position by compression spring means. When a predetermined weight of broilers has been deposited in the receiving tray, the tray and its supporting frame pivot downwardly to actuate a switch for deactivating the conveyor system. The fowl receiving tray is then lowered downwardly by a carriage on which it is mounted which is carried by canted vertically extending carrier frame members. The fowl receiving tray is positioned adjacent the open side of a coop compartment of a large coop unit into which the broilers in the tray are deposited by a pivotal and linear movement of the tray toward the coop compartment which results in a gentle sliding deposit of the broilers into the coop compartment. The carriage is then returned to its upper position to permit the tray to receive another group of broilers upon reactivation of the conveyor system and the process is repeated until all of the coop compartments of the particular coop unit have been filled.

Another aspect of the invention resides in the provision of supporting means for the coop unit which is transversely shiftable on a shiftable frame to position one or the other of the two vertical banks of coop compartments of the unit in alignment with the fowl receiving tray means. Thus, when the particular bank has been completely filled with broilers, the coop unit is shifted to permit the remaining bank of coop compartments to be filled. The coop units are supported so as to be tiltable at a canted angle during their filling so as to enhance the efficiency and speed of the filling operation.

A better understanding of the manner in which the preferred embodiment achieves the foregoing objects will be enabled when the following detailed description is considered in conjunction with the appended drawings in which like reference numerals are used for the same parts as illustrated in the different figures.

DESCRIPTION OF THE PREFERRED EMBODIMENT

Figure 1:
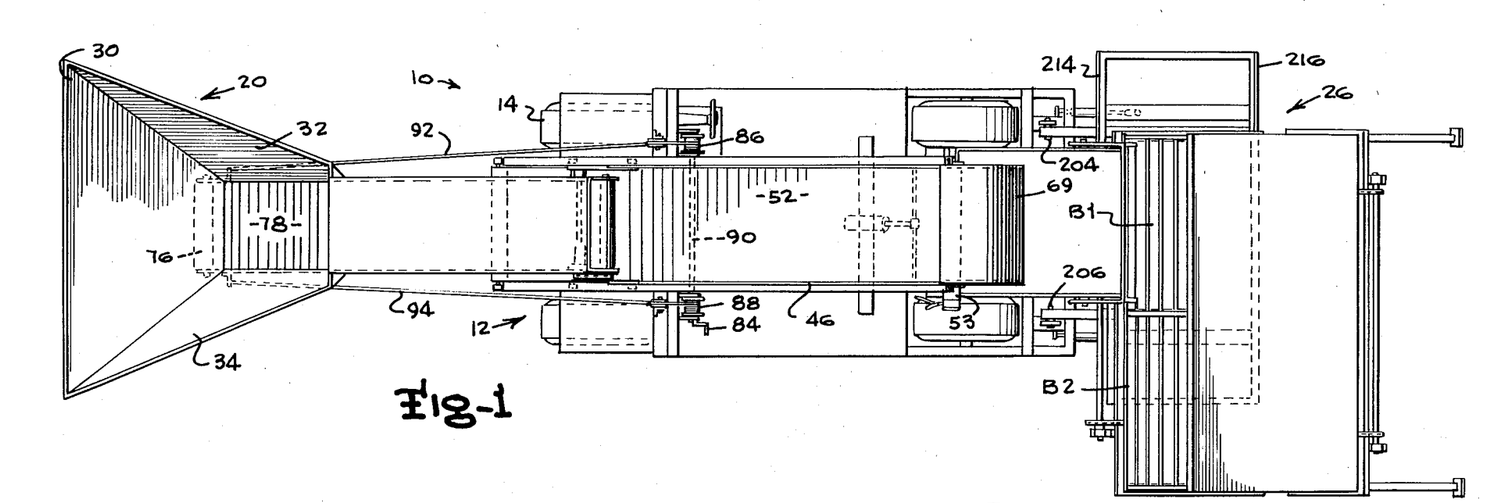
FIG. 1 is a top plan view of the preferred embodiment.
Figure 2:
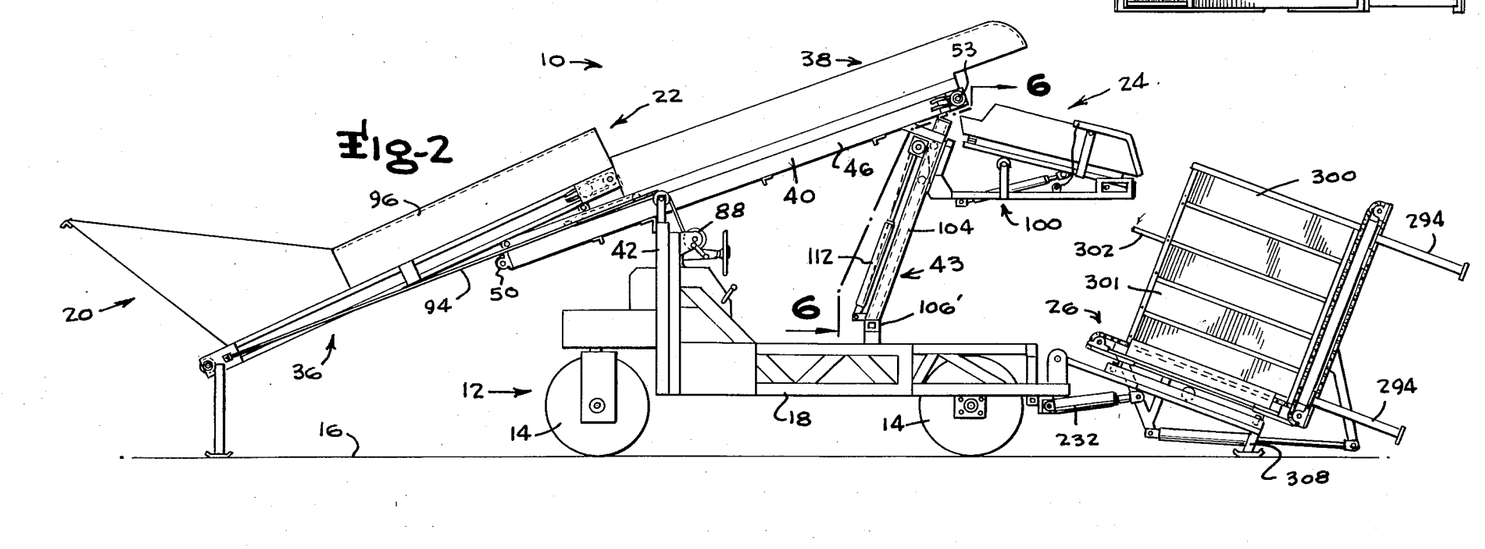
FIG. 2 is a side elevation view thereof illustrating the components in a use position.

Attention is initially invited to FIGS. 1 and 2 which illustrate the primary components of the preferred embodiment, generally designated 10, and which includes a motor driven vehicle 12 supported on wheels 14 for movement across a supporting surface 16 which might be the ground or the floor of a brood house. The vehicle 12 includes a frame 18 on which various functional components are mounted. The primary components of the preferred embodiment comprise an infeed hopper 20, conveyor means 22, fowl receiving and holding means 24 and coop unit supporting means 26 on which a coop unit 300 is positioned. In operation, fowl are positioned in the infeed hopper 20 and are conveyed by conveyor means 22 to the fowl receiving and holding means 24 from which they are discharged into one of a plurality of coop compartments in coop unit 300 after a predetermined quantity of fowl have been positioned in the holding means 24.

Infeed hopper 20 comprises a floor panel 30 and side panels 32 and 34 mounted on the lower end of conveyor means 22. In use, fowl are either manually positioned or discharged from another conveyor into the infeed hopper from which they are conveyed upwardly by the conveyor 22 in a manner to be discussed hereinafter.

Figure 4:
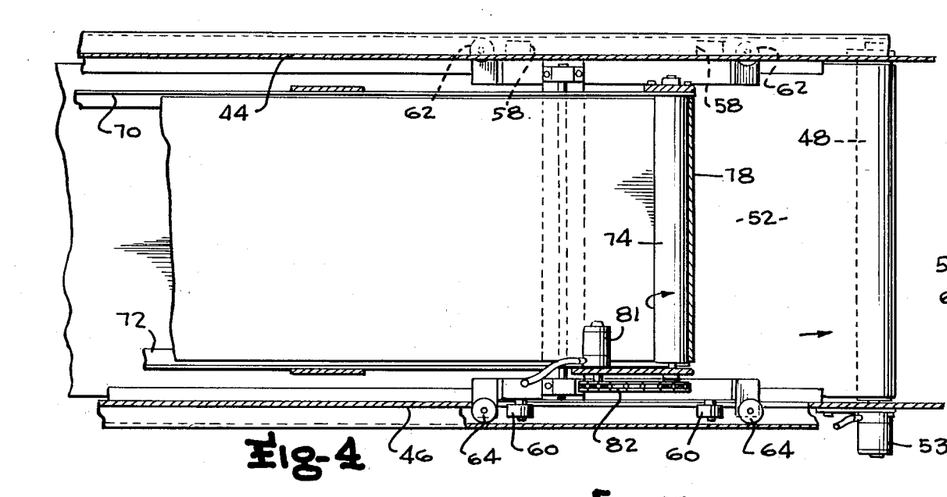
FIG. 4 is a sectional view taken along lines 4—4 of FIG. 3.
Figure 5:
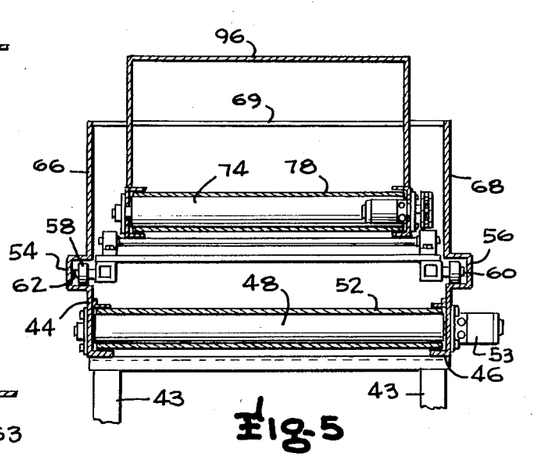
FIG. 5 is a sectional view taken along lines 5—5 of FIG. 3.
Figure 6:
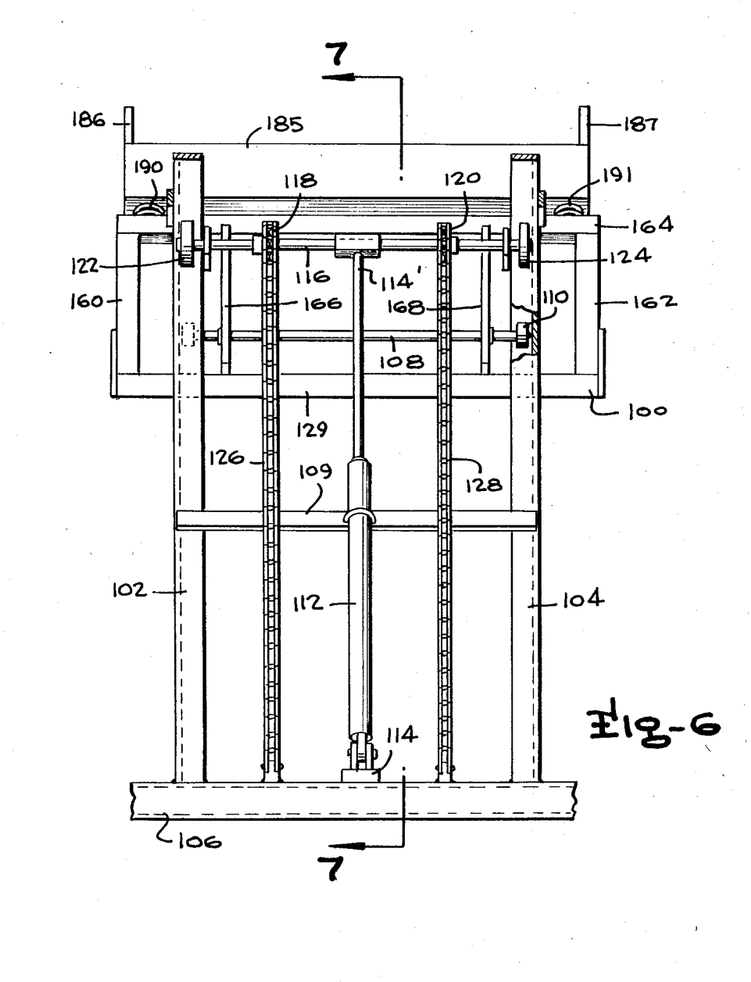
FIG. 6 is a sectional view taken along lines 6—6 of FIG. 2.

Conveyor 22 consists of an extendible infeed section 36 and an outfeed section 38 with the outfeed section comprising a fixed frame 40 supported on the upper end of vertical members 42 adjacent the front of vehicle 12 and canted carrier frame means 43 positioned more rearwardly of the vehicle. More specifically, the fixed frame 40 comprises side frame members 44 and 46 which are best shown in FIGS. 4 and 5 and which provide support for a driven upper roller 48 (FIG. 4) and a lower idler roller 50 (FIG. 2) over which a conveyor belt 52 travels. A hydraulic motor 53 drives roller 48 for effecting movement of conveyor belt 52 in an obvious manner.

Roller guide channels 54 and 56 are respectively provided along the upper edges of the side frame members 44 and 46 as best shown in FIG. 5 for receiving side carrier rollers 58 and 60 and transverse guide rollers 62 and 64 mounted on the upper end of the infeed conveyor section 36. Side panels 66 and 68 extend upwardly respectively from the roller guide channels 54 and 56. A deflector panel 69 extends between the uppermost ends of the side panels 66 and 68 for guiding fowl downwardly from the upper discharge end of the outfeed section 38.

Figure 3:
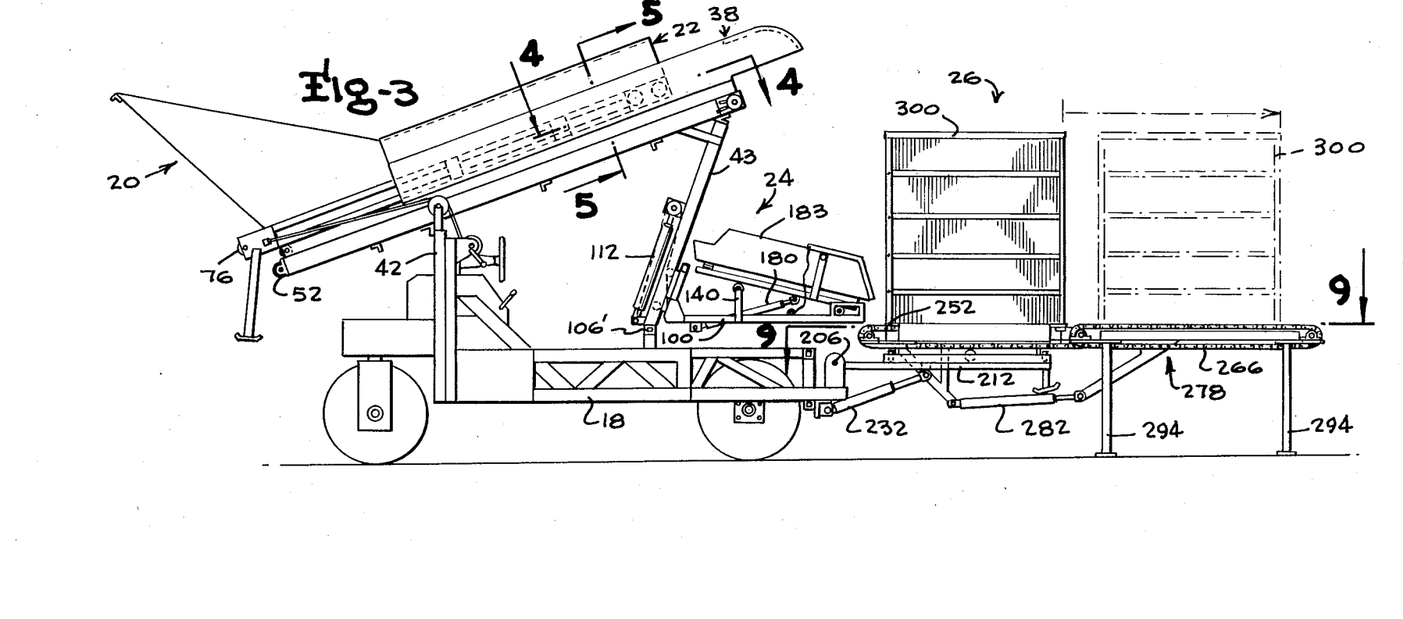
FIG. 3 is a side elevation view illustrating the components in a contracted non-use position.

Infeed conveyor section 36 includes side frame members 70 and 72 to the upper ends of which rollers 58, 62, 60, and 64 are mounted and on the upper ends of which an upper conveyor roller 74 is mounted. A lower conveyor roller 76 extends between the lower ends of the side frame members 70 and 72 and an infeed conveyor belt 78 extends about rollers 74 and 76. A hydraulic motor 81 drives roller 74 by means of a chain transmission 82. Motor 81 and all of the other hereinafter described motors are driven by pressurized hydraulic fluid from a pump driven by the vehicle motor and controlled by conventional manual or electrical valves and the like. It should be observed that the infeed conveyor section 36 is positioned as shown in FIG. 2 during use of the apparatus but can be stowed in the position of FIG. 3 for movement of the vehicle for storage during periods of non-use. Movement of the infeed section 36 from the position of FIG. 2 to the position of FIG. 3 is effected by operation of a winch handle 84 which drives plural drums 86 and 88 through a common shaft 90. Cable members 92 and 94 extend from drums 86 and 88 and have their lower ends connected to the lower ends of frame members 70 and 72 so that upon rotation of the drum members the infeed section can be moved upwardly from the FIG. 2 position with the upper end being guided by rollers 58, 60, etc. in an obvious manner. It should be observed that a sheet metal cover 96 covers the upper portion of the lower infeed conveyor belt 78.

Figure 7:
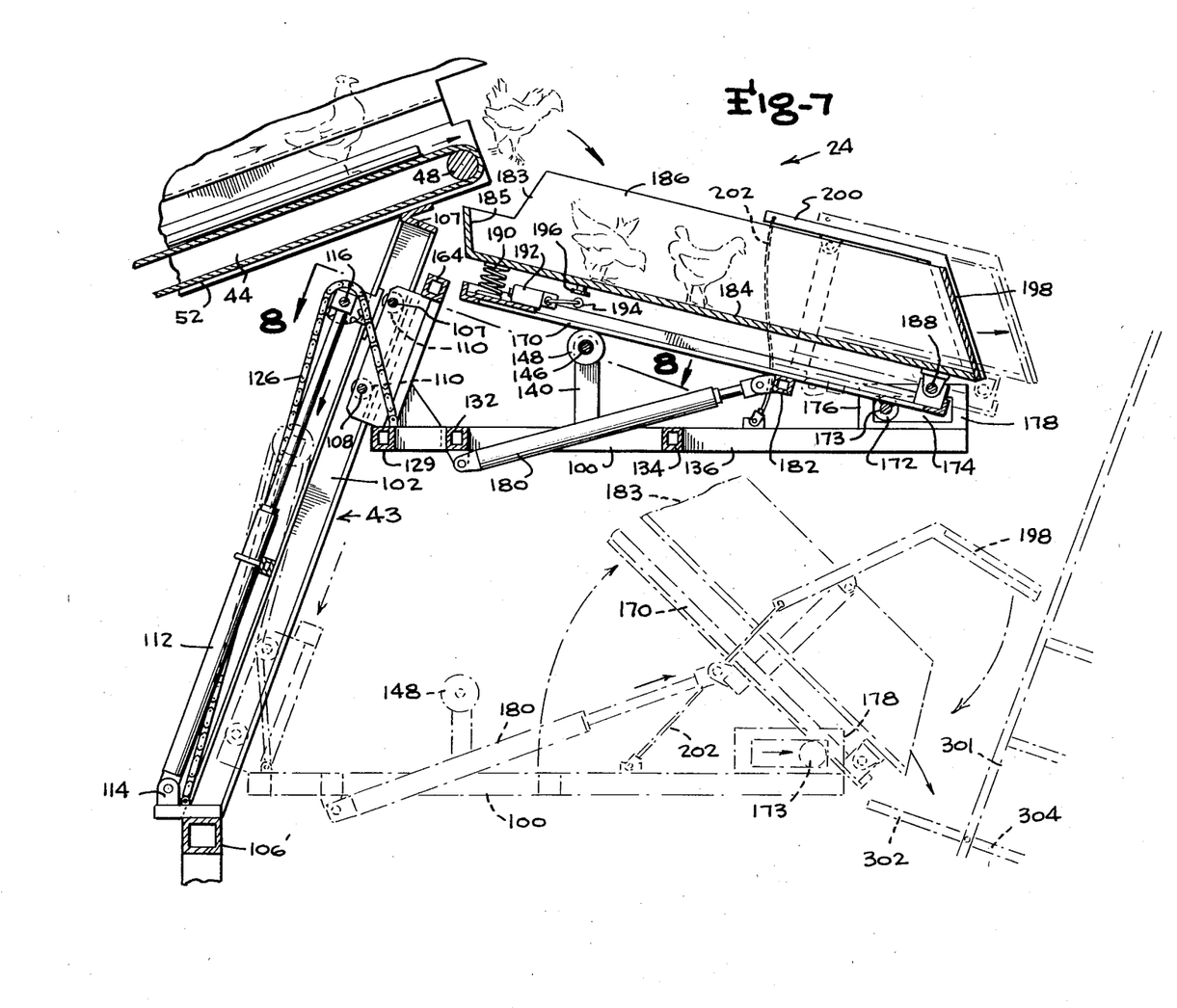
FIG. 7 is a sectional view taken along lines 7—7 of FIG. 6.
Figure 8:
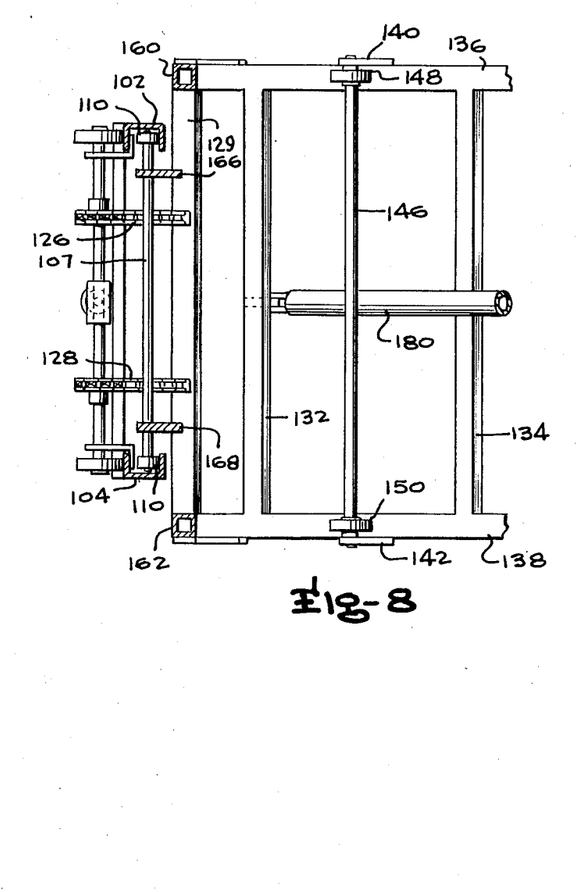
FIG. 8 is a sectional view taken along lines 8—8 of FIG. 7.

The fowl receiving and holding means 24 comprises a transfer carriage 100 mounted for vertical movement along the length of first and second channel members 102 and 104 of carrier frame 43 which are welded at their lower ends to a box frame 106' of the vehicle frame 18 and to upper conveyor support frame 109. Elements 102, 104, and 109 constitute the main elements of the canted carrier frame means 43. Carriage 100 includes roller members 110 which engage flanges of the channel members 102, 104 so as to permit the carriage 100 to be movable between the solid line position to the phantom line position as shown in FIG. 7. Such movement is effected by virtue of actuation of a carriage lift cylinder 112 which is pivotally connected to a bracket 114 on the box frame 106' and has the outer end of its rod 114' supporting a movable axle 116 on which idler sprockets 118 and 120 are mounted. Idler guide rollers 122 and 124 are mounted on the extreme ends of the movable axle 116 and ride on the forward surfaces of the channel members 102 and 104 respectively. Chain members 126 and 128 have their lower ends connected to the box frame 106' and extend about idler sprockets 118 and 120 with their opposite ends being connected to a transverse frame component 129 of carriage 100 as best shown in FIGS. 7 and 8. It will consequently be seen that extension of the cylinder 112 will serve to move the carriage 100 to its upper position as shown in FIG. 7 whereas retraction of the cylinder will result in movement of the carriage to its lower phantom line position of FIG. 7.

Vertically movable carriage 100 additionally includes transverse frame members 132 and 134 extending between side frame elements 136 and 138 with vertical carrier plates 140 and 142 being welded to the side frame members 136 and 138 and providing support for a transverse shaft 146 on which idler rollers 148 and 150 are mounted. Also, it should be observed that the carriage includes rearwardly canted side frame members 160 and 162 across the top of which a transverse frame member 164 extends. Shaft members 107 and 108 are mounted on carrier plates 166 and 168 extending between the frame members 129 and 164.

A rectangular pivot frame 170 is mounted on the carriage 100 and includes rearward rollers 172 mounted on axle 173 and positioned in elongated rectangular openings 174 provided between vertical frame members 176 and 178 on the rearmost portions of both sides of the vertically moveable carriage 100 as shown in FIG. 7. The forward end of the rectangular pivot frame 170 normally rests on the idler rollers 148 and 150 as shown in FIG. 7. However, a hydraulic pivot cylinder assembly 180 has its base end connected to transverse frame member 132 and has its rod connected to a transverse frame member 182 of the rectangular pivot frame. Contraction of cylinder assembly 180 moves the pivot frame 170 to the position shown in FIG. 7.

A fowl receiving tray 183 including a bottom panel 184, a front panel 185, and side panels 186, 187 is mounted for limited pivotal movement about a pivot 188 fixedly positioned on the rectangular pivot frame 170. The forward end of the fowl receiving tray 183 is supported by coil compression springs 190 and 191 having their lower ends engaged with and fixed to the rectangular pivot frame 170. A microswitch 192 is positioned on frame 170 and has an actuator 194 positioned beneath a protrusion 196 on the bottom panel 184 of the receiving tray 183 so that upon the deposit of a predetermined weight of fowl in the receiving tray, springs 190 and 191 are compressed to actuate switch 192 in an obvious manner. The weight of fowl necessary to actuate the switch can be varied by changing springs 190 and 191 for springs of greater or lesser compression resistance. The rear end of the receiving tray 183 is provided with a pivotal gate 198 having an actuator lever 200 connected by a flexible cord 202 to the vertically movable carriage 100 for opening gate 198 in a manner to be discussed.

It should be observed that actuation of the pivot cylinder assembly 180 serves to initially move the rectangular pivot frame 170 to the right until rollers 172 engage the vertical frame members 178 following which further extension of the cylinder assembly results in pivotal movement of frame 170 about the axis of shaft 173 to the phantom line position shown in FIG. 7. The pivotal movement of pivot frame 170 results in tightening of cord 202 which consequently serves to open gate 198 to permit fowl within the tray to slide downwardly and outwardly along bottom panel 184 into an adjacent coop compartment.

The cage unit supporting means 26 is mounted for pivotal movement about pivot pins 204 of the vehicle frame 18. More specifically, pivot pins 204 and 206 pivotally support pivot arms 208 and 210 of a transversely extending carriage mounting frame 212 which includes transverse angle members 214 and 216 and end frame members 218 and 220 welded to the members 214 and 216. Pivotal movement of the frame 212 is effected by actuation of hydraulic tilt cylinders 230 and 232 extending between the vehicle frame 18 and the carriage mounting frame 212.

Figures 10, 11:
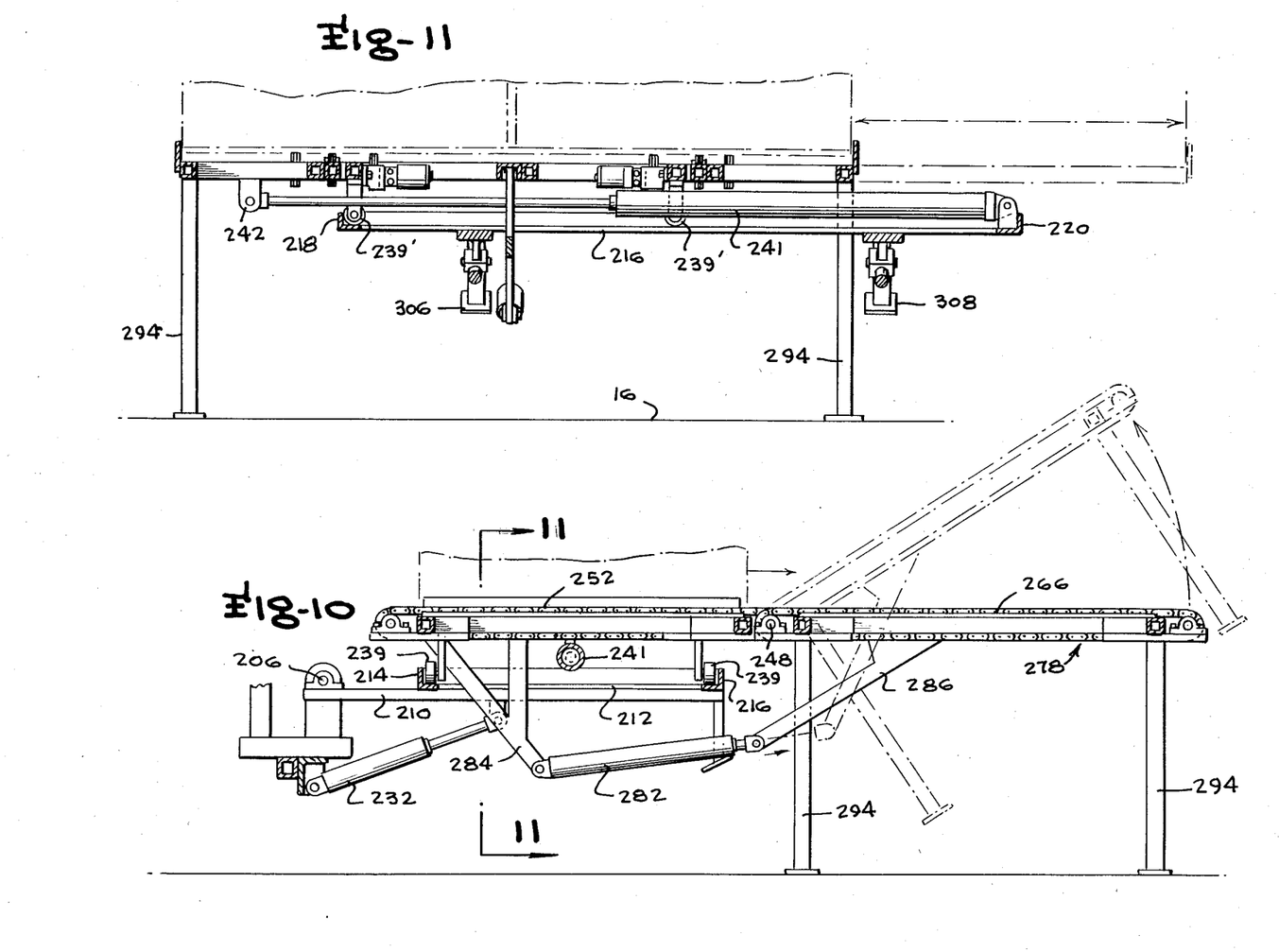
FIG. 10 is a sectional view taken along lines 10—10 of FIG. 9.
FIG. 11 is a sectional view taken along lines 11—11 of FIG. 10.

A transversely shiftable coop unit carriage includes a frame 234 including elongated transverse frame members 235 and 236, end frame members 237 and 238, and intermediate frame members 239 and 240 is mounted for reciprocation on carrier frame 212 by means of rollers 239' received in the transverse angle members 214 and 216 of carrier frame 212. Movement of the conveyor carriage frame 234 between its two extreme positions illustrated in the solid line and phantom line positions of FIG. 11 is effected by means of a frame shift cylinder 241 having its base mounted in frame member 220 of carrier frame 212 and having its rod connected to a bracket 242 on the conveyor carriage frame 234. Hydraulic motors 244 and 246 are mounted on the frame members 239 and 240 respectively and drive a shaft 248 which in turn serves to drive coop unit conveyor including chains 250 and 252 which extend from sprockets 254 and 256 on shaft 248 over sprockets 258 and 260 on a shaft 262 on the opposite side of the conveyor carriage frame 234. Also, driven rotation of shaft 248 serves to drive infeed-outfeed conveyor chains 264 and 266 mounted on sprockets 268, 270 on shaft 248 and sprockets 272 and 274 on a shaft 276 mounted on a rectangular swing frame 278.

The rectangular swing frame 278 is pivotally supported on shaft 248 and is capable of movement between a horizontal position as illustrated in solid lines in FIG. 10 and a perpendicular position relative to the conveyor carriage frame 234 as shown in FIG. 2. Swinging movement of the swing frame 278 is effected by actuation of a hydraulic cylinder 282 mounted on a downwardly extending arm 284 of the conveyor carriage frame 234 and having its rod end connected to an arm 286 extending downwardly from an intermediate frame member 288 of the swing frame 278. Swing frame 278 also includes frame members 290, 291, 292, and 293 which are welded unitarily together to provide sufficient strength and rigidity. Vertical ground engaging posts 294 provide support for the swing frame 278 when it is in its horizontal position illustrated in FIG. 10.

Figure 9:
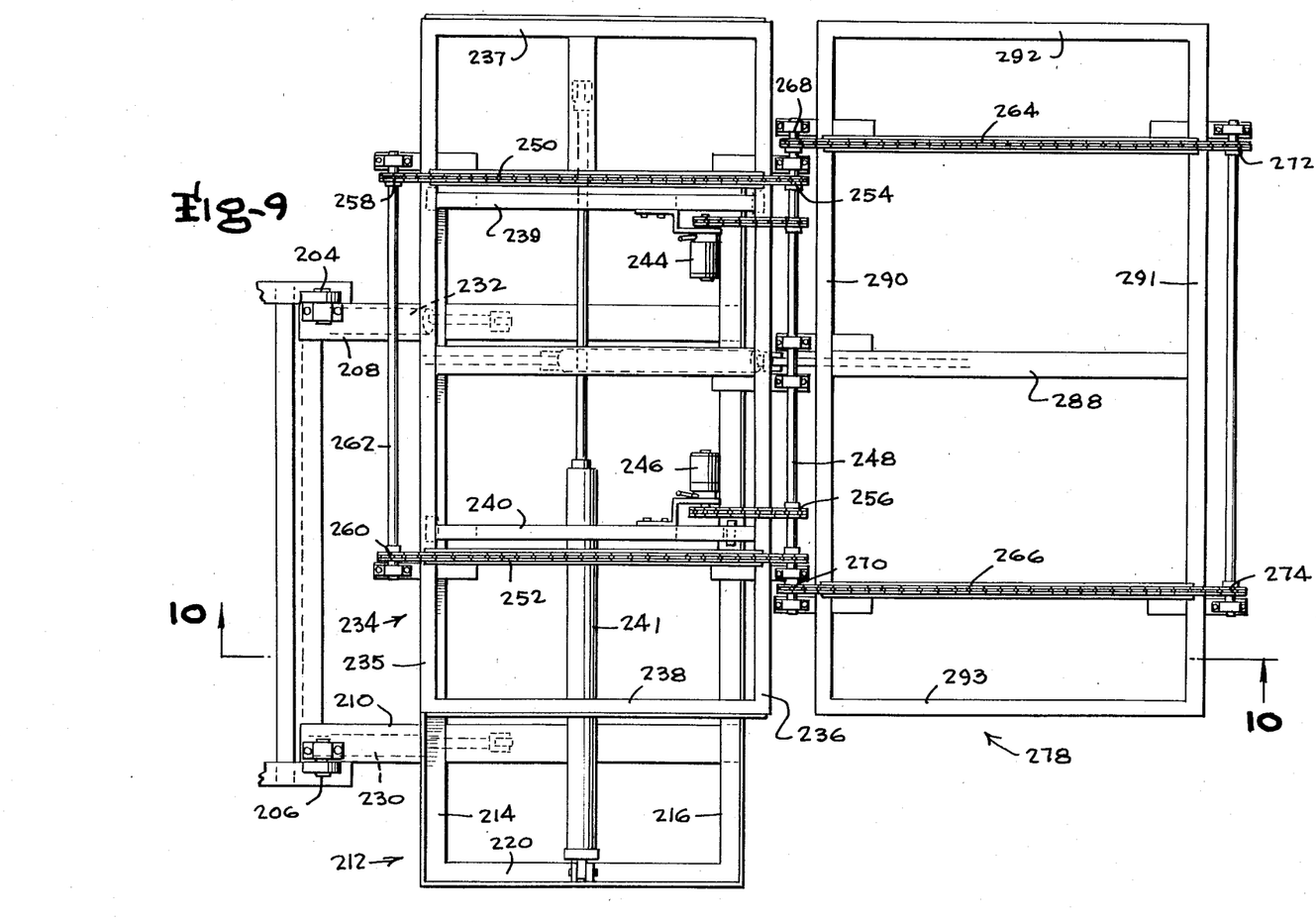
FIG. 9 is a sectional view taken along lines 9—9 of FIG. 3.

In use, the frames 234 and 278 are positioned as shown in FIG. 9 and carrier frame 212 and the swing frame 278 are initially positioned in horizontal aligned positions as shown in FIG. 10 by proper actuation of cylinders 241, 232 and 282. A unitary cage unit 300 having a length approximately the same as frame members 235, 236, 290, 291 is then positioned on the infeed-outfeed conveyor chains 264, 266 by means of a forklift or the like. The coop unit comprises two vertical banks B1 and B2 of stacked coop compartments 301 each of which has a downwardly opening gate door 302 pivotally mounted adjacent the forward edge of a floor component 304 as shown in FIG. 7. In the illustrated particular case, each bank comprises five vertically stacked coop compartments as shown in FIG. 2.

After the coop unit 300 is positioned on chains 266, hydraulic motors 244 and 246 are actuated to drive chains 264, 266, 250, and 252 to move the coop unit 300 from the dotted line to the solid line position shown in FIG. 3. The swing frame 278 is consequently empty and cylinder 282 is actuated to pivot the swing frame about shaft 248 to bring it into a substantially vertical position in which it is perpendicular to the conveyor carriage frame 234. Frame shift cylinder 241 is then contracted to bring the conveyor carriage frame 234 into alignment with carrier frame 212 as shown in FIG. 1. The first vertical bank of coop compartments B1 is consequently aligned with the fowl receiving and holding means 24. Hydraulic tilt cylinders 230 and 232 are then actuated to tilt the carrier frame 212 and all of the structure carried thereby to the position shown in FIG. 2 in which the rear portions of the cage units are lowered to the illustrated position which is maintained by support pad members 306 and 308 (FIGS. 11 and 2) which engage the supporting surface 16.

The infeed conveyor section 36 is extended downwardly to the position shown in FIGS. 1 and 2 by operation of winch means 84, 88, 86, etc. and cylinder 112 is extended to position the fowl receiving and holding means 24 in its upper elevated position shown in FIG. 2. Hydraulic motors 53 and 81 are actuated to effect movement of the conveyor belts 52 and 78 and the system is ready for operation.

Fowl deposited in infeed hopper 20 will consequently be conveyed upwardly by the conveyor belt and deposited in the receiving tray 183 of the fowl receiving and holding means 24 as best shown in FIG. 7. When a predetermined weight of fowl has been deposited, switch 192 will be actuated to actuate a solenoid valve (not shown) to cut off the flow of hydraulic fluid to the conveyor drive motors 53 and 81 to temporarily terminate the feeding of fowl into the fowl receiving and holding means 24. Cylinder 112 will then be contracted to lower the carriage 100 and the associated fowl receiving tray 183 and the fowl therein into position in alignment with an empty coop compartment 301. Pivot cylinder is then extended to move the rectangular pivot frame 170 to the right and then pivot it in a clockwise direction as shown in phantom in FIG. 7. The pivotal movement of frame 170 will serve to open gate 198 to permit the fowl in the receiving tray 183 to slide downwardly and outwardly into the aligned coop compartment 301. It should be noted that the position of the gate door 302 of the particular coop compartment is such as to direct the fowl into the coop compartment in an obvious manner.

Upon completion of the unloading of the receiving tray 183, cylinder 180 is contracted and cylinder 112 is extended to return the tray 183 to its upper position adjacent the discharge end of conveyor belt 52 and the conveyor motors are reactivated to repeat the cycle. It should be observed that the fowl in tray 183 will be unloaded during the next cycle of operation in the coop compartment 301 immediately above the previously loaded coop compartment with the cycle being repeated until all of the coop compartments of the vertical bank B1 have been loaded. The frame shift cylinder 241 will then be extended to position the vertical bank B2 of coop compartment in alignment with the fowl receiving and holding means 24 and the loading cycle will be repeated five times to fill each of the coop compartments of the vertical bank B2. Upon completion of the loading of vertical bank B2, the entire coop unit 300 will be full and cylinder 232 will be extended and cylinder 282 will be contracted to bring the carrier frame 212 and the swing frame 278 into horizontal alignment as shown in FIG. 10. Conveyor chains 250, 252, 264, and 266 will then be driven by motors 244 and 246 to effect movement of the loaded coop unit 300 onto the swing frame 278 from which it can be removed by a forklift or other similar means.

It should be understood that the present disclosure relates only to the preferred embodiment of the invention and numerous modifications will undoubtedly occur to those of skill in the art. Therefore, the spirit and scope of the invention is not restricted to the preferred embodiment but is to be limited solely by the appended claims.

I claim:

1. A fowl cooping apparatus comprising:
   a support frame;
   movable infeed hopper means mounted on said support frame and selectively positionable in a desired location adjacent ground level for receiving fowl to be harvested;
   coop unit supporting means mounted on said support frame;
   a coop unit including a plurality of coop compartments in a vertical and horizontal array mounted on said coop unit supporting means;
   fowl receiving and holding means mounted on said support frame;
   power driven conveyor means for conveying fowl from said infeed hopper means to said fowl receiving and holding means;
   discharge means for discharging fowl from said fowl receiving and holding means into any selected one of said coop compartments; and
   interruption means for deactivating said conveyor means in response to the positioning of a predetermined weight of fowl in said fowl receiving and holding means.

2. The apparatus of claim 1 wherein said power driven conveyor means includes:
   an extendible infeed conveyor section and an outfeed conveyor section; and
   wherein said outfeed conveyor section includes means supporting said infeed conveyor section for relative axial adjustment movement relative to said outfeed conveyor section.

3. The apparatus of claim 2 additionally including carrier frame means supporting said fowl receiving and holding means for movement in a vertically extending path of movement from an upper fowl-receiving position adjacent a discharge end of said outfeed conveyor section and a lower position aligned with a selected coop compartment.

4. The apparatus of claim 3 wherein said fowl receiving and holding means includes:
   transfer carriage means mounted for movement on said carrier frame means;
   a fowl receiving tray mounted on said transfer carriage means for limited pivotal movement relative to said transfer carriage means between an upper position and a lower position relative to said transfer carriage;
   biassing means urging said fowl receiving tray toward its upper position;
   a switch actuator on said tray; and
   wherein said interruption means includes switch means positioned beneath said switch actuator for actuation thereby in response to the positioning of a predetermined weight of fowl in said tray sufficient to overcome the urging of said biassing means so as to move said tray to a lower position to actuate said switch means.

5. The apparatus of claim 4 additionally including:
   pivot frame means mounted on said transfer carriage means;
   pivot means on said pivot frame means pivotally supporting said fowl receiving tray for pivotal movement relative to said pivot frame means;
   pivotal support means on said pivot frame means engageable with said transfer carriage and supporting said pivot frame means for pivotal movement relative to said transfer carriage about a horizontal axis; and
   power actuator means for pivoting said pivot frame means and said fowl receiving tray between a first slightly inclined fowl receiving position and a second substantially inclined fowl discharge position.

6. The apparatus of claim 5 wherein said fowl receiving tray includes:
   a bottom panel, side panels, and a discharge gate extending between said side panels and being movable between an open position and a closed position; and
   means for opening said discharge gate in response to movement of said pivot frame and fowl receiving tray to said substantially inclined position.

7. The apparatus of claim 6 wherein said coop unit supporting means comprises:
   a transversely extending carriage mounting frame mounted for pivotal movement adjacent one end of said support frame;
   a transversely shiftable coop unit carriage mounted on said carriage mounting frame for linear movement between first and second positions thereon;
   coop unit conveyor means mounted on said coop unit carriage for operation in a direction substantially perpendicular to the direction of movement of said coop unit carriage;
   swing frame means pivotally mounted on one edge of said transversely shiftable coop unit carriage for pivotal movement between a first position substantially parallel and coplanar with said carriage mounting frame and a second position substantially perpendicular to said carriage mounting frame;
   infeed-outfeed conveyor menas mounted on said swing frame means for movement toward or away from said coop unit carriage; and
   wherein said coop unit comprises at least two vertical stacked banks of coop compartments provided in a unitary supporting framework with door gate members provided along a common wall of said coop unit for each of said coop compartments, said coop unit being dimensioned so as to be positionable on said infeed-outfeed conveyor means for movement onto said coop unit conveyor means so that one bank of said coop compartments is in alignment with said fowl receiving and holding means when said coop unit carriage is in its first position with the other bank of coop compartments being in alignment with said fowl receiving and holding means when said coop unit carriage is in its second position.

8. The apparatus of claim 7 additionally including:
hydraulic tilt cylinder means mounted on said support frame and connected to said carriage mounting frame for pivoting said carriage mounting frame about a horizontal axis on said support frame;
hydraulic cylinder means mounted on said carriage mounting frame and connected to said swing frame for pivotally moving said swing frame between its first and second positions;
frame shift cylinder means mounted on said carriage mounting frame and connected to said coop unit carriage for shifting said coop unit carriage between its two positions of movement; and
carriage lift cylinder means mounted on said support frame and connected to said transfer carriage for moving said transfer carriage between its upper position adjacent the discharge end of said outfeed conveyor section and a selected lower position adjacent a selected one of the coop compartments of said cage unit.

9. The apparatus of claim 3 wherein said fowl receiving and holding means includes:
transfer carriage means mounted for movement on said carrier frame means;
pivot frame means mounted on said transfer carriage means;
a fowl receiving tray mounted on said pivot frame means for limited pivotal movement relative to said pivot frame means between an upper position and a lower position;
biassing means urging said fowl receiving tray towards its upper position;
a switch actuator on said tray; and
wherein said interruption means includes switch means positioned beneath said switch actuator for actuation thereby in response to the positioning of a predetermined weight of fowl in said tray sufficient to overcome the urging of said biassing means so as to move said tray to a lower position to actuate said switch means;
power cylinder means connected between said transfer carriage and said pivot frame means; and
a lost motion pivot drive connection between said pivot frame means and said transfer carriage for permitting initial expansion of said power cylinder means to effect linear movement of said pivot frame means toward said coop unit with further expansion of said power cylinder means effecting pivotal movement of said pivot frame means to cant said fowl receiving tray toward said coop unit.

10. The apparatus of claim 3 wherein said fowl receiving and holding means includes:
transfer carriage means mounted for movement on said carrier frame means;
pivot frame means mounted on said transfer carriage means;
a fowl receiving tray mounted on said pivot frame means for limited pivotal movement relative to said pivot frame means between an upper position and a lower position;
power cylinder means connected between said transfer carriage means and said pivot frame means operable for movement between a contracted position in which said fowl receiving tray is slightly canted toward said coop unit and an extended position in which said fowl receiving tray is substantially canted toward said coop unit;
a lost motion connection between said pivot frame means and said power cylinder means for permitting initial expansion of said power cylinder means to effect initial linear movement of said pivot frame means toward said coop unit with further expansion of said power cylinder means effecting pivotal movement of said pivot frame means to its substantially canted position to effect the discharge of the fowl from said tray into a coop compartment of said coop unit.

11. The apparatus of claim 9 wherein said lost motion connection between said pivot frame means and said power cylinder means comprises means defining an elongated slot on said transfer carriage means and roller means mounted on said pivot frame means and positioned in said elongated slot for limited linear movement therein.

12. The apparatus of claim 11 additionally including:
biassing means urging said fowl receiving tray toward its upper position;
switch actuator means mounted on said fowl receiving tray; and
wherein said interruption means includes switch means positioned beneath said switch actuator for actuation by said switch actuator in response to the positioning of a sufficient weight of fowl in said tray to overcome the urging of said biassing means so as to move said tray to a lower position to effect actuation of said switch means.

13. The apparatus of claim 12 wherein said power driven conveyor means comprises a conveyor belt and a hydraulic motor and said interruption means comprises an electrically operated valve in a supply line from a source of hydraulic pressure connected to said hydraulic motor.

14. The apparatus of claim 12 wherein said fowl receiving tray includes:
a bottom panel, side panels, and a discharge gate extending between said side panels and being movable between an open position and a closed position; and
means for opening said discharge gate in response to movement of said pivot frame and fowl receiving tray to said substantially inclined position.

15. The apparatus of claim 13 wherein said coop unit supporting means comprises:
a transversely extending carriage mounting frame mounted for pivotal movement adjacent one end of said support frame;
a transversely shiftable coop unit carriage mounted on said carriage mounting frame and movable between first and second positions thereon;
coop unit conveyor means mounted on said coop unit carriage for operation in a direction substantially perpendicular to the direction of movement of said coop unit carriage;
swing frame means pivotally mounted on one edge of said transversely shiftable conveyor carriage for movement between a first position substantially parallel and coplanar with said carriage mounting frame means and a second position substantially perpendicular to said carriage mounting frame means;

infeed-outfeed- conveyor members mounted on said swing frame for movement toward or away from said carriage mounting frame means; and wherein said coop unit comprises at least two vertical stacked banks of coop compartments provided in a unitary supporting framework with door gate members provided along a common wall of said cage unit for each of said coop compartments, said cage unit being dimensioned so as to be positionable on said infeed-outfeed conveyor of said swing frame for movement onto said coop unit conveyor means so that one bank of said coop units is in alignment with said fowl receiving and holding means when said coop unit carriage is in its first position with the other bank of coop units being in alignment with said fowl receiving and holding means when said shiftable carriage frame is in its second position.

16. The apparatus of claim 15 additionally including:

hydraulic tilt cylinder means mounted on said support frame and connected to said carriage mounting frame for pivoting said carriage mounting frame about a horizontal axis on said support frame;

hydraulic cylinder means mounted on said carriage mounting frame and connected to said swing frame for pivoting said swing frame between its first and second positions;

frame shift cylinder means mounted on said carriage mounting frame and connected to said coop unit carriage for shifting said coop unit carriage frame between its two extreme positions of movement; and carriage lift cylinder means mounted on said support frame and connected to said transfer carriage for moving said transfer carriage between its upper position adjacent the discharge end of said outfeed conveyor section and a selected lower position adjacent a selected one of the coop compartments of said cage unit.

17. A fowl cooping apparatus comprising:

a vehicle including a support frame;

infeed hopper means mounted forwardly of said support frame and selectively positionable adjacent ground level for receiving fowl to be harvested;

coop unit supporting means mounted on a rearward portion of said support frame;

a coop unit including a plurality of coop compartments in a vertical and horizontal array mounted on said coop unit supporting means;

fowl receiving and holding means mounted on said support frame immediately forward of said coop unit supporting means;

power driven conveyor means for conveying fowl from said infeed hopper means to said fowl receiving and holding means; and discharge means for discharging fowl from said fowl receiving and holding means into any selected one of said coop compartments.

18. The apparatus of claim 17 wherein said power driven conveyor means includes:

an extendible infeed conveyor section and an outfeed conveyor section; and wherein said outfeed conveyor section includes means supporting said infeed conveyor section for relative axial adjustment movement relative to said outfeed conveyor section.

19. The apparatus of claim 18 additionally including carrier frame means supporting said fowl receiving and holding means for movement in a vertically extending path of movement between an upper fowl-receiving position and a lower fowl-discharge position aligned with a selected coop compartment.

20. The apparatus of claim 19 wherein said fowl receiving and holding means includes:

transfer carriage means mounted for movement on said carrier frame means;

a fowl receiving tray mounted on said transfer carriage means for limited pivotal movement relative to said transfer carriage means between an upper position and a lower position relative to said transfer carriage;

biassing means urging said fowl receiving tray toward its upper position;

a switch actuator on said tray; and interruption means for deactivating said conveyor means in response to the positioning of a predetermined weight of fowl in said fowl receiving tray, said interruption means including switch means positioned beneath said switch actuator for actuation thereby in response to the positioning of a predetermined weight of fowl in said tray sufficient to overcome the urging of said biassing means so as to move said tray to a lower position to actuate said switch means.

* * * * *